(12) United States Patent
Viol

(10) Patent No.: US 7,259,867 B2
(45) Date of Patent: Aug. 21, 2007

(54) METHOD AND DEVICE FOR ANALYZING A LIGHT INTENSITY DISTRIBUTION OVER A CROSS-SECTION OF A LASER BEAM

(75) Inventor: Wolfgang Viol, Adelebsen (DE)

(73) Assignee: Fachhochschule Hildeschltm/Holzminden/Gottingen, Hildesheim (DE)

( * ) Notice: Subject to any disclaimer, the term of this patent is extended or adjusted under 35 U.S.C. 154(b) by 337 days.

(21) Appl. No.: 10/855,128

(22) Filed: May 27, 2004

(65) Prior Publication Data
US 2004/0218186 A1 Nov. 4, 2004

Related U.S. Application Data

(63) Continuation-in-part of application No. PCT/EP02/13361, filed on Nov. 27, 2002.

(30) Foreign Application Priority Data
Nov. 30, 2001 (DE) ................... 101 58 859

(51) Int. Cl.
G01B 11/02 (2006.01)
(52) U.S. Cl. ................................... 356/511
(58) Field of Classification Search ............ 356/489, 356/495, 511–515
See application file for complete search history.

(56) References Cited

U.S. PATENT DOCUMENTS 3,857,636 A * 12/1974 Angelbeck ............... 356/450

| 4,173,442 | A  |   | 11/1979 | Snyder |
|---|---|---|---|---|
| 4,993,824 | A  | * | 2/1991  | Bluege ................ 359/846 |
| 5,694,209 | A  |   | 12/1997 | Alfille et al. |
| 6,888,859 | B2 | * | 5/2005  | Weber et al. ............ 372/34 |

FOREIGN PATENT DOCUMENTS

| DE | 4006618 A | 9/1919 |
| EP | 0893675 A | 1/1919 |
| WO | WO9410538 | 5/1994 |

OTHER PUBLICATIONS

Fischer, Robert E., "Optical System Design", Jun. 1, 2000, McGraw-Hill, XP 002240111, ISBN: 0071349162, pp. 308-313.
"Influence of Optical Components on the Beam Quality of High Power Lasers", Einfluß optischer Komponenten auf die Strahlqualitat von Hochleistungslasern, B. G. Teubner Stuttgart, 1993., pp. 36-37, 105-107,116-117.

* cited by examiner

Primary Examiner—Gregory J. Toatley, Jr.
Assistant Examiner—Patrick J. Connolly
(74) Attorney, Agent, or Firm—Thomas, Kayden, Horstemeyer & Risley, LLP

(57) ABSTRACT

For analysis and/or monitoring the light intensity distribution over the cross-section of a laser beam (1), the laser beam (1) is reflected with a laser mirror (2), and local thermal expansions of the laser mirror (2) caused by different light intensities incident on the laser mirror (2) are detected.

22 Claims, 3 Drawing Sheets

METHOD AND DEVICE FOR ANALYZING A LIGHT INTENSITY DISTRIBUTION OVER A CROSS-SECTION OF A LASER BEAM

CROSS REFERENCE TO RELATED APPLICATIONS

This application is a continuation in part of International Application PCT/EP02/13361 with an international filing date of Nov. 27, 2002 and claiming the benefit of co-pending German Patent Application No. 101 58 859.3 entitled "Verfahren und Vorrichtung zur Analyse und Überwachung der Lichtintensitätsverteilung über den Querschnitt eines Laserstrahls", filed on Nov. 30, 2001.

FIELD OF THE INVENTION

The invention relates to a method and an apparatus for analysing a light intensity distribution over a cross-section of a laser beam. Analysing the light intensity distribution particularly includes monitoring the light intensity distribution for any kind of change of the light intensity distribution.

BACKGROUND OF THE INVENTION

In recent years, laser beams have become more and more important as an universal tool for material processing. Particularly, laser beams of a $CO_2$-Laser having a laser power in the order of one to several kW are used in manufacturing processes like welding, cutting, drilling, soldering, inscribing, for surface treatment and so on. In these processes, it is important that the light intensity distribution and the position of the laser beam are monitored even during the actual material processing. Within the present d description, monitoring the position of a laser beam which is a special case of monitoring the light intensity distribution over the cross-section of the laser beam will not always be especially highlighted, because a change in position is nothing else than a movement of the center and the borders of the light intensity distribution of the laser beam.

From U.S. Pat. No. 5,694,209 it is known to scan the cross-section of a laser beam with a small reflecting element and to analyze a laser light reflected out of the laser beam with the reflecting element. The mechanical efforts which are required for scanning the laser beam with the reflecting element are enormous. Additionally, the beam quality of the laser beam is decreased due to scanning it with the reflecting element. If the laser beam is a laser beam of a $CO_2$-laser, for example, which has a wave length in the infrared range, the analysis of the light intensities reflected out of the laser beam is also difficult due to the general difficulties in determining small intensities of light particularly in the infrared range.

For analysing or monitoring a light intensity distribution over a cross-section of a laser beam, it is known from German Patent Application published as DE 40 06 618 A1 to provide a laser mirror reflecting the laser beam with small channels. If these channels have a defined geometry and defined distances, a portion of the laser beam incident on the channels leaves the surface of the laser mirror as a measurement radiation whose partial waves starting at the channels are superimposed in an intensifying way in at least one direction. Thus a measurement beam is formed which is detected by a detector. The portion of the laser beam incident on the plane surface between the channels is geometrically-optically reflected as a main beam at the same time. If the total area of all channels is small as compared to the total mirroring surface, only a very limited portion of the light intensity of the laser beam is coupled out towards the detector. The actual loss in laser power, however, is relevant. Additionally, there is the effort for forming the laser mirror in the special way, and there are difficulties in analyzing the small out-coupled laser light intensities with regard to their spatial distribution, particularly, if it is infrared laser light of the laser beam of a $CO_2$-laser, for example.

As a reference to its own prior art DE 40 06 618 A1 also describes a method of analysing or monitoring a light intensity distribution over a cross-section of a laser beam in which a residual roughness of a plane mirroring surface of a laser mirror reflecting the laser beam is used for obtaining scattered light which is detected with a detector. The roughness of presently used laser mirrors, however, is typically only just $\frac{1}{1000}$ of the laser wave length. Thus, present laser mirrors have a residual roughness which is far below the value shown by laser mirrors 10 to 20 years ago, i.e. at the application date of DE 40 06 618 A1. At that time, a residual roughness of laser mirrors for laser beams of $\frac{1}{10}$ to $\frac{1}{20}$ of the laser wave length was common. Therefore, in contrast to the past, there should be no relevant scatter signal left, if a present laser mirror is considered. Even if such a scatter signal would still be there, it would be in the infrared range in case of infrared laser beams, and thus it could only be analyzed with corresponding high efforts.

Thus, there is still a need for a method and a device for analysing and/or monitoring the light intensity distribution over the cross-section of a laser beam, which may even then be realized with low constructive efforts, if the light intensity distribution of an infrared laser light beam is to be detected, and which at the same time avoid any relevant deformation of the laser beam over its cross-section.

SUMMARY OF THE INVENTION

In one aspect the invention provides a method of analysing a light intensity distribution over a cross-section of a laser beam comprising the steps of: reflecting the laser beam with a laser mirror having a mirroring surface; detecting local thermal expansions of the laser mirror at the mirroring surface caused by different light intensities of the laser beam incident on the mirroring surface; correlating the distribution of the detected local thermal expansions of the laser mirror at the mirroring surface with the different light intensities of the laser beam over its cross-section.

In another aspect the invention provides a device for analysing a light intensity distribution over a cross-section of a laser beam comprising: a laser mirror having a mirroring surface and reflecting the laser beam; a detector detecting local thermal expansions of the laser mirror at the mirroring surface caused by different light intensities of the laser beam incident on the mirroring surface; and an evaluation unit correlating the distribution of the detected local thermal expansions of the laser mirror at the mirroring surface with the different light intensities of the laser beam over its cross-section.

Normally, the mirroring surface of the laser mirror is a polished reflecting surface but it may also be a mirroring surface of a Bragg mirror.

In material processing, the requirements with regard to a laser mirror allow for a thermal deformation of $\frac{1}{20}$ of the laser wave length. The radiation of a $CO_2$-Laser, for example, has a wave length of 10.6 μm. Thus, the mirroring surface of a laser mirror may be deformed by 500 nm at the maximum. This deformation can be detected by an interferometer or a wavefront sensor, for example.

Especially, a light interferometer detection using a coherent measurement light beam which preferably has a smaller wave length than the laser wave length of the laser beam may be provided. For example, a measurement light beam of a HeNe-Laser is suitable which allows for resolutions in interferometrically detecting the local thermal expansions at the mirroring surface of the laser mirror of about 30 nm.

A light interferometer using a measurement light beam of a HeNe-Laser has already been used for detecting thermal expansions at a mirroring surface of a laser mirror, see S. Borik: "Einfluss optischer Komponenten auf die Strahlqualität von Hochleistungslasern", Stuttgart (1993), particularly FIG. 4.12. Borik, however, did not analyze the light intensity distribution of the laser beam but the quality of the laser mirror which is affected by any local deformations. Borik mentioned that the deformations of the laser mirror due to the thermal expansions at the mirroring surface occur within one second after switching on the high power laser beam, but he did not mention the influence of changes within the light intensity distribution of the laser beam on the local thermal expansions of the laser mirror detected at the mirroring surface. Thus, the invention showed for the first time that the thermal expansions at the mirroring surface represent the light intensity distribution of the laser beam in sufficient detail with regard to both its spatial resolution and its resolution in time so that they can be used for analysing and monitoring the laser beam.

In the embodiments of the invention using an interferometer, a coherent measurement light beam coming from a measurement light source is preferably perpendicularly directed towards the laser mirror so that it is reflected onto itself. In this way, an interference pattern is formed which is easily observed between the laser mirror and a reference surface. For, example, a beam splitter can be provided in the measurement light beam to observe the interference pattern with a camera. The camera can be a CCD- or a CMOS-detector, for example. It is an important advantage of the invention that it is not necessary to register absolute light intensities in the interference pattern. Instead, it is sufficient to observe the interference pattern and its changes as such.

Effects by different thermal expansions at the mirroring surface of the laser mirror are particularly easily determined, if the reference surface comprises a defined variation in the distance to the laser mirror so that, without the local thermal expansions, there is a uniform interference pattern consisting of parallel stripes, for example. By different local thermal expansions at the mirroring surface this interference pattern is characteristically deformed.

It has to be made clear that in the all embodiments of the invention the light intensity of the measurement light beam has to be smaller by orders than the light intensity of the laser beam so that the thermal expansions of the laser mirror because of the different light intensities of the laser beam incident on the laser mirror are the dominant measurement effect. However, light intensities in the mW range are sufficient for detecting the local thermal expansion. These intensities are by some orders smaller than the typical total light intensity of a laser beam for material processing in the order of 1 kW.

A wavefront sensor which may be used for detecting the local thermal expansions of the laser mirror at the laser surface is, for example, disclosed in D. Schaefer, et al.: "Laser beam characterization using a Hartmann-Shack wavefront sensor" which is incorporated by reference. In the embodiments of the invention using a n wavefront sensor, the wavefront sensor is combined with a measurement light source providing a measurement light beam which is reflected by the laser mirror onto the wavefront sensor. The wavefront sensor is not arranged in the beam path of the high power laser beam to be analyzed with regard to its intensity distribution.

To the end of the desired measurement effect being sufficient but the laser beam reflected by the laser mirror not being distorted in the practice of the invention, some aspects have to be considered in designing the laser mirror. The absorption of the light intensities of the laser beam upon reflecting the laser beam should be in the small percent range; the thermal expansion normal to the mirroring surface should be in the range of a few 100 nm; and a thermal conductivity in the plane of the mirroring surface should be such that there is a spatial resolution of the thermal expansion within the mirroring surface of about 1 mm and a sufficient resolution in time. This is achieved, if the laser mirror is designed in such a way that it has a light absorption of less than 10%, preferably of less than 5%, in reflecting the laser beam; an effective thermal conductivity of about 100 to 200 W/mK at its mirroring surface; and a thermal expansion coefficient of about 10 to $20 \times 10^{-6}$ 1/K with at its mirroring surface.

Particularly, the laser mirror can be designed in such a way that it has a multi metal layer structure comprising a massive main body for carrying off heat, a expansion layer arranged on the massive main body and having a thickness in the order of 1 mm, and a thin reflection coating layer arranged on top of the expansion layer. The material of the three components of the layer structure can be optimized in view of their respective function without drawbacks resulting with regard to other part aspects of the function of the laser mirror.

For constructing the laser mirror in such a way that it has an effective thermal conductivity of 100 to 200 W/mK and a thermal expansion coefficient of 10 to $20*10^{-6}$ 1/K at its mirroring surface with a light absorption of less than 5%, it may, for example have a main body made of copper which is provided with an about 1 mm thick expansion layer of lead, the lead layer being coated with gold or nickel to enhance its reflection. Because of its little thickness, the reflective coating has no relevant influence on the thermal conductivity and the thermal expansion of the laser mirror at the mirroring surface. By means of the indicated material combination, a very small absorption coefficient for the laser radiation in the range of 1% is realized. The thermal conductivity and the thermal expansion coefficient of this combination are such that a sufficient high local resolution is given with a sufficient high measurement effect but without an undue deformation of the reflected laser beam.

To achieve the goal of an optimal representation of the intensity distribution of the high-power laser beam by the local thermal deformation of the mirror it is also possible to optimize the geometry of cooling channels for a coolant running behind the mirroring surface within the laser mirror. Particularly, a high stiffness of the whole laser mirror has to be maintained to avoid a vault of the whole mirror caused by the thermal expansion of the layers close to the surface. At the same time the position of the cooling channels has to be chosen in such a way that a certain amount of mirror material between the mirror surface and the cooling channel is maintained to achieve a sufficient expansion for detection purposes. A laser mirror comprising a number of cooling channels running in parallel to the mirroring surface and in parallel to each other is one preferred embodiment.

BRIEF DESCRIPTION OF THE DRAWINGS

The invention can be better understood with reference to the following drawings. However, the components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
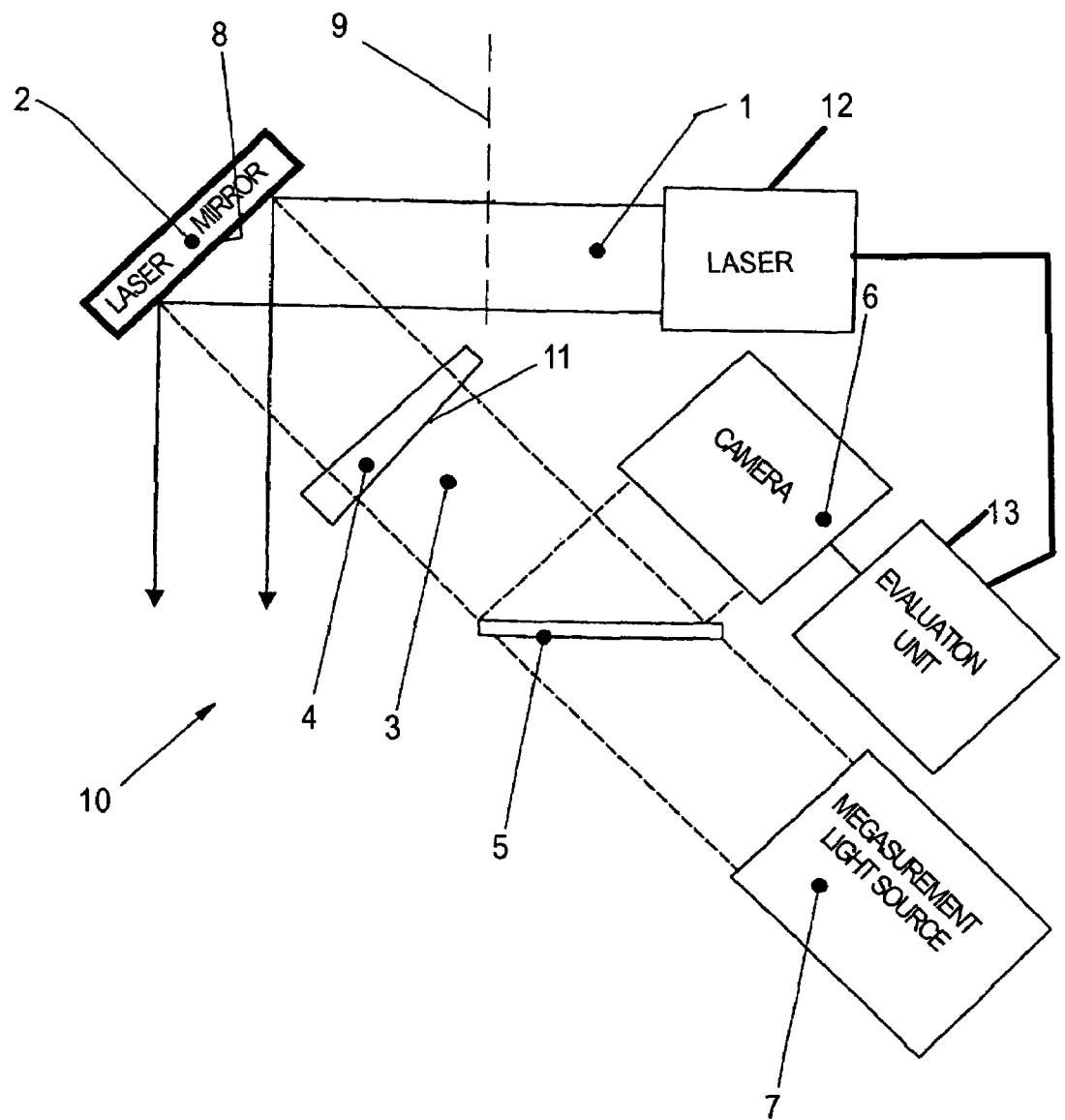
FIG. 1 shows the principle arrangement of a first embodiment of the invention.

Referring now in greater detail to the drawings, FIG. 1 illustrates a laser beam 1 which is provided by a laser 12 and reflected by a laser mirror 2 having a mirroring surface 8. Such a reflection of a laser beam 1 nearly always occurs in material processing by means of a laser beam, and is used to direct the laser beam into a desired processing area. Here, the laser mirror 2 is at the same time a part of a device 10 for analysis or monitoring the light intensity distribution over a cross-section of the laser beam 1. Specifically, the light intensity distribution 1 is detected over the mirroring surface 8 of the laser mirror 2 which is not at right angles to the beam axis of the laser beam 1. This light intensity distribution over the mirroring surface 8 can be easily transformed into a light intensity distribution which is present over a cross-section 9 running at right angles across the laser beam 1. The position of the laser beam 1 with regard to the mirroring surface 8 or within the cross-section 9, respectively, is one of the aspects of the light intensity distribution which is detected here. Further parts of the device 10 besides the laser mirror 2 are a measurement light source 7, a beam splitter 5, a reference plate 4, a camera 6, and an evaluation unit 13. The measurement light source 7 is a HeNe-laser here, and provides a coherent measurement light beam 3. The measurement light beam 3 passes through the beam splitter 5 without reflection. It then gets to the mirroring surface 8 via the reference plate 4. From there, it is reflected onto itself and forms an interference pattern between a reference surfaces 11 which is the surface of the wedge-shaped reference plate 4 directed towards the beam splitter 5 and the mirroring surface 8. This interference pattern is observed with the camera 6 via the beam splitter 5. In case of an absolutely plane mirroring surface 8, the interference pattern registered by the camera 6 is a stripe pattern, because of the wedge-shape of the reference plate 4. As soon as the laser mirror 2 is heated up at the mirroring surface 8 by different incident light intensities in different ways so that there are thermal expansions of different height, the interference pattern is deformed in a way which is indicative of the light intensity distribution over the cross-section 9. This deformation is registered by the camera 6 which may be a CCD-array. The evaluation unit 13 connected to the camera 6 is thus particularly able to determine non-homogeneities in the light intensity distribution over the cross section 9 and variations of the light intensity distribution with time. Absolute light intensities can also be determined by an integration of registered variations of the interference pattern. Similarly, the position of the laser beam 1 with regard to the cross-section 9 can be determined both with regards to its borders and with regard to the center of its light intensity distribution. All of these possibilities are achieved with a comparatively low constructive effort, and particularly with a light intensity of the measurement light beam 3 which is not affecting the measurement result.

Figure 2:
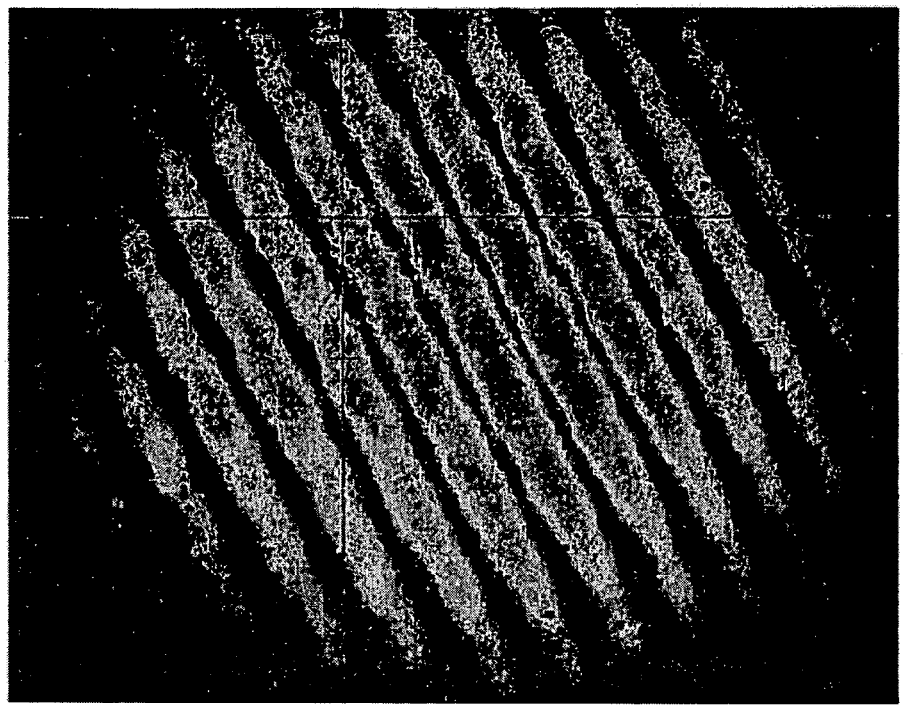
FIG. 2 shows an interference pattern occurring in the arrangement of FIG. 1 prior to switching on a laser beam to be analyzed.

FIG. 2 shows so-called Fizeau-stripes as an example of an interference pattern which is recorded with the camera 6 according to FIG. 1. The Fizeau-stripes running in straight lines and parallel with regard to each other correspond to a plane mirroring surface 8. In other words, the laser beam 1 was switched off during recording of the interference pattern according to FIG. 2.

Figure 3:
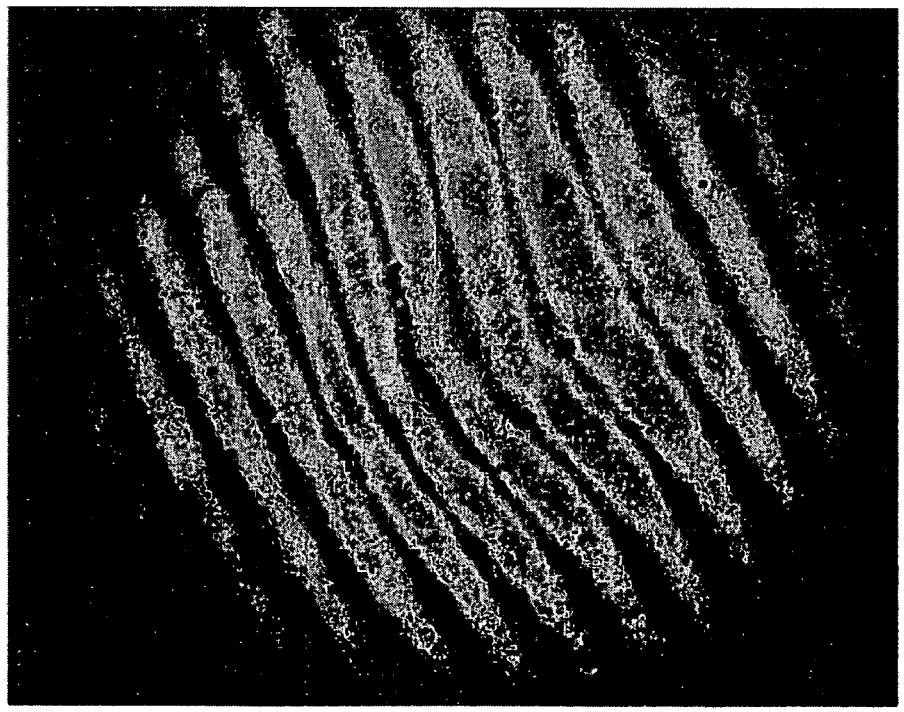
FIG. 3 shows an interference pattern occurring in the arrangement of FIG. 1 after switching on the laser beam.

On the other hand, the pattern of the Fizeau-stripes according to FIG. 3 is deformed in its centre, as in this case the laser beam has heated up the laser mirror there, which has resulted in a local thermal expansion of the laser mirror 2 at the mirroring surface 8. If, for example, the interference pattern of the Fizeau-stripes according to FIG. 3 corresponds to a desired form, i.e. a desired intensity distribution over the cross section of the laser beam 1, it is sufficient to detect a change of this interference pattern with the camera 6 as an indication that the desired intensity distribution is no longer given. Correspondingly, a material processing can, for example, only be enabled, if the camera 6 acknowledges the special interference pattern which corresponds to the desired beam cross section.

Figure 4:
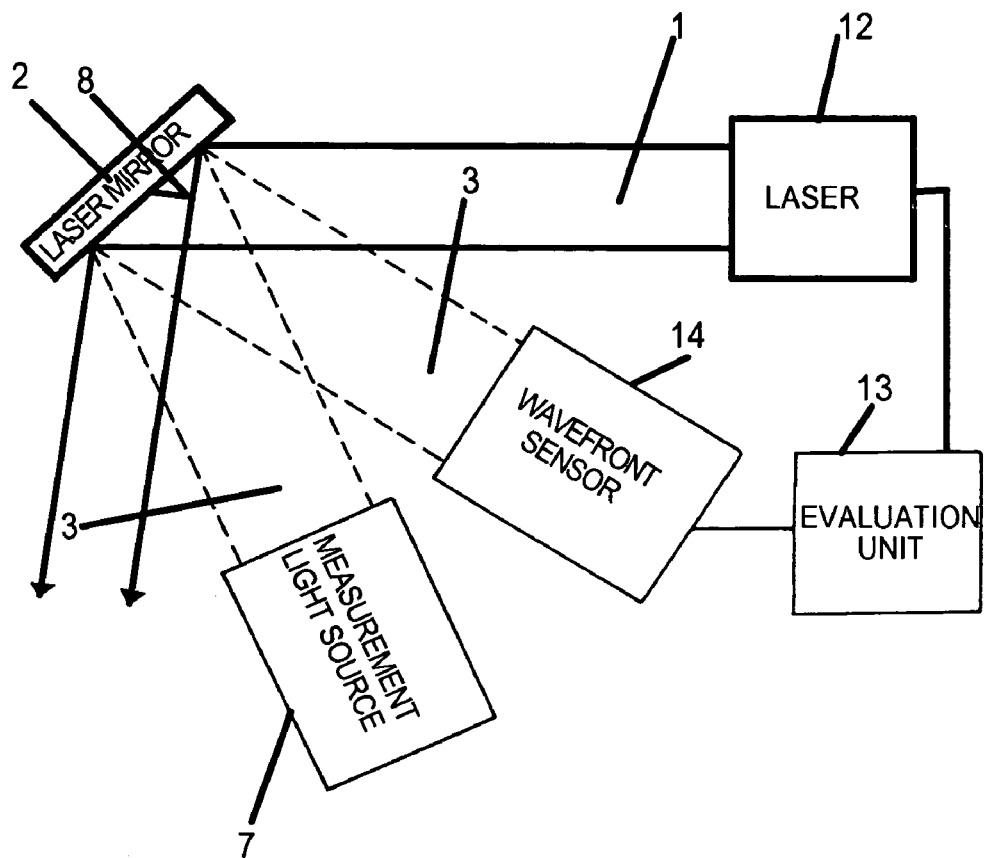
FIG. 4 shows the principle arrangement of a second embodiment of the invention.

The embodiment of the invention depicted in FIG. 4 differs from that one depicted in FIG. 1 with regard to the way in which the local thermal expansions at the mirroring surface 8 are detected. According to FIG. 4, the device 10 comprises a measurement light source 7, a wavefront sensor 14 and an evaluation unit 13 besides the laser mirror 2. A measurement light beam 3 coming from the measurement light source 7 is reflected by the laser mirror 2 onto the wavefront sensor 14 which detects the deformations of the wavefronts of the measurement light beam 3 due to the local thermal expansions of the laser mirror 2. The evaluation unit 13 which is connected both to the wavefront sensor 14 and the laser 12 surveys the light intensity distribution of the laser beam and signals any relevant changes of the light intensity distribution to the laser 12.

Figure 5:
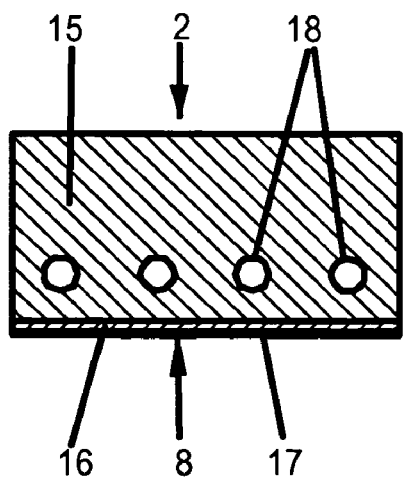
FIG. 5 shows a cross-section of a laser mirror used in both embodiment of the invention which are illustrated in FIGS. 1 and 4.

FIG. 5 shows a metal layer structure of the laser mirror 2 according to FIGS. 1 and 4. The laser mirror 2 has a main body 15 made of copper which is provided for carrying off any heat created in the laser mirror 2 by absorbing light to achieve a good resolution in time with the measurement effect observed here. The main body 15 is covered with an about 1 mm thick expansion layer 16 made of lead. The expansion layer 16 is coated with a reflection coating 17 made of gold or nickel to increase its reflection coefficient. Because of its little thickness which may be by some orders below 1 mm, the reflective coating 17 which provides the mirroring surface 8 of the laser mirror 2 has no relevant influence on the thermal conductivity and the thermal expansion of the laser mirror at the mirroring surface but it results in a very small absorption coefficient for the laser beam 1 and the measurement light beam 3 in the range of 1%. The main body 15 is provided with cooling channels 18 for a coolant which may be circulated through the cooling channels to enhance the removal of heat from the laser mirror 2. The cooling channels 18 are running in parallel both to the mirroring surface 8 and to each other.

Many variations and modifications may be made to the preferred embodiments of the invention without departing substantially from the spirit and principles of the invention.

All such modifications and variations are intended to be included herein within the scope of the present invention, as defined by the following claims.

The invention claimed is:

1. A method of analysing a light intensity distribution over a cross-section of a laser beam comprising the steps of:
   reflecting the laser beam with a laser mirror having a mirroring surface;
   detecting local thermal expansions of the laser mirror at the mirroring surface caused by different light intensities of the laser beam incident on the mirroring surface;
   correlating the distribution of the detected local thermal expansions of the laser mirror at the mirroring surface with the different light intensities of the laser beam over its cross-section to determine at least one of non-homogeneities in a light intensity distribution of the light intensities of the laser beam over its cross-section, variations of a light intensity distribution of the light intensities of the laser beam over its cross-section, absolute light intensities of the light intensities of the laser beam over its cross section, a position of the laser beam with regard to its borders, or a position of the laser beam with regard to a center of a light intensity distribution of the light intensities of the laser beam.

2. The method of claim 1, wherein a coherent measurement light beam is directed towards the laser mirror which is reflected by the laser mirror onto itself for interferometrically detecting the local thermal expansions of the laser mirror at the mirroring surface.

3. The method of claim 2, wherein an interference pattern of the measurement light beam between the laser mirror and a reference surface is observed.

4. The method of claim 3, wherein the reference surface comprises a defined variation in distance to the laser mirror.

5. The method of claim 1, wherein a measurement light beam is directed towards the laser mirror which is reflected by the laser mirror onto a wavefront sensor detecting the local thermal expansions of the laser mirror at the mirroring surface.

6. The method of claim 1, wherein the laser mirror is designed in such way that it has:
   a light absorption of less than 5% in reflecting the laser beam;
   an effective thermal conductivity of 100 to 200 W/mk at its mirroring surface; and
   a thermal expansion coefficient of 10 to $20\times10^{-6}$ 1/K at its mirroring surface.

7. A device for analysing a light intensity distribution over a cross-section of a laser beam comprising:
   a laser mirror having a mirroring surface and reflecting the laser beam;
   a detector detecting local thermal expansions of the laser mirror at the mirroring surface caused by different light intensities of the laser beam incident on the mirroring surface; and
   an evaluation unit correlating the distribution of the detected local thermal expansions of the laser mirror at the mirroring surface with the different light intensities of the laser beam over its cross-section.

8. The device of claim 7, wherein the detector comprises an interferometer having a measurement light source which provides a coherent measurement light beam directed towards the laser mirror and reflected by the laser mirror onto itself.

9. The device of claim 8, wherein the interferometer comprises
   a beam splitter arranged in the measurement light beam;
   a reference surface which arranged between the laser mirror and the beam splitter; and
   a camera observing an interference pattern of the measurement light beam between the laser mirror and the reference surface.

10. The device of claim 9, wherein the reference surface is a surface of a reference plate and has a defined variation in distance to the mirroring surface of the laser mirror.

11. The device of claim 7, wherein the detector comprises a wavefront sensor and a measurement light source which provides a measurement light beam directed towards the laser mirror and reflected by the laser mirror onto the wavefront sensor.

12. The device of claim 11, wherein the wavefront sensor is a Hartmann-Shack wavefront sensor.

13. The device of claim 7, wherein the evaluation unit is designed and arranged to recognize deviations of an actual distribution of the detected local thermal expansions from a predetermined distribution of the local thermal expansions which corresponds to a desired light intensity distribution of the laser beam.

14. The device of claim 13, wherein the evaluation unit is designed and arranged to switch of the laser beam if there is a deviation of the actual distribution of the detected local thermal expansions from the predetermined distribution of the local thermal expansions.

15. The device of claim 7, wherein the laser mirror has:
   a light absorption of less than 10% in reflecting the laser beam;
   an effective thermal conductivity of 100 to 200 W/mk at its mirroring surface; and
   a thermal expansion coefficient of 10 to $20\times10^{-6}$ 1/K at its mirroring surface.

16. The device of claim 15, wherein the laser mirror comprises a metal layer structure having:
   a massive main body for carrying off heat;
   an expansion layer arranged on top of the main body; and
   a reflection coating arranged on top of the expansion layer.

17. The device of claim 16, wherein the main body is made of Cu.

18. The device of claim 16, wherein the expansion layer is made of Pb.

19. The device of claim 16, wherein the reflection coating is made of a material selected from the group consisting of Au and Pb.

20. The device of claim 16, wherein the massive main body is provided with a plurality of cooling channels for a coolant.

21. The device of claim 16, wherein the cooling channels run in parallel both to the mirroring surface of the laser mirror and to each other.

22. The device of claim 15, wherein the laser mirror has a light absorption of less than 5% in reflecting the laser beam.

* * * * *